350-96.18 SR

OR 3,877,784

United States Patent [19]

X 3062N

Lin

[11] 3,877,784

[45] Apr. 15, 1975

[54] BEAM ADDRESS OPTICAL STORAGE HEAD

[75] Inventor: Burn Jeng Lin, Shrub Oak, N.Y.

[73] Assignee: International Business Machines Corporation, Armonk, N.Y.

[22] Filed: Sept. 20, 1973

[21] Appl. No.: 399,007

[52] U.S. Cl. ......... 350/96 WG; 350/96 C; 350/151; 350/162 R

[51] Int. Cl. ......................... G02b 5/14; G02b 27/00

[58] Field of Search . 350/96 WG, 96 C, 151, 162 R

[56] References Cited

UNITED STATES PATENTS

| | | | |
|---|---|---|---|
| 3,410,623 | 11/1968 | Kogelnik | 350/96 WG UX |
| 3,640,197 | 2/1972 | Sanera | 350/162 R |
| 3,737,236 | 6/1973 | Borrelli | 350/96 WG X |
| 3,774,987 | 11/1973 | Boivin | 350/96 WG |
| 3,779,628 | 12/1973 | Kapron et al. | 350/96 WG |

OTHER PUBLICATIONS

Lean et al., "Integrated Optic Read-Write Head," IBM Technical Disclosure Bulletin, Vol. 15, No. 8, January 1973, p. 2630.

*Primary Examiner*—John K. Corbin
*Attorney, Agent, or Firm*—Sughrue, Rothwell, Mion, Zinn and Macpeak

[57] ABSTRACT

The beam address optical storage head uses the high resolution focusing properties which result from near-field diffraction of a slit or its equivalent. The slit is flown over the recording media much like a magnetic head to provide high bit densities along the track. The head may comprise a single focusing element or a plurality of focusing elements with beam-steering. Fully integrated optical head structures fabricated using techniques similar to those used for integrated semiconductor circuitry are disclosed. Illumination for the head may be provided by an integrated source or an outside source coupled to the integrated head. The focusing structure for the head in the various embodiments may take the form of metallic or dielectric wave guides or a stack of thin slits.

35 Claims, 14 Drawing Figures

BEAM ADDRESS OPTICAL STORAGE HEAD

BACKGROUND OF THE INVENTION

1. Field of the Invention

The present invention generally relates to optical storage systems, and more particularly to a head or transducer usable in a beam address optical storage system wherein the transducer employs the high resolution focusing properties which result from near-field diffraction of a slit or its equivalent.

2. Description of the Prior Art

Optical data processing systems using integrated optics are becoming increasingly attractive due to the high bit densities of the storage systems. In the integration of optical circuitry, thin film light guides are used wherein the film is generally of a thickness approximating the wave length of the light to be transmitted. Focusing in optical wave guides is one of the main problems for the application of integrated optics. It has been proposed to produce focusing elements by incorporating areas into the film which have a different wave guide index than the rest of the film. Change in the wave guide index can be obtained by modifying the thickness or the refractive index of the film or by overcoating the film with another material. The drawback for this proposal is that the obtainable change in the mode index is very small and high resolution lenses can not be produced. Another proposal would produce focusing elements by depression or protrusion in the surface of the substrate; however, the resolution of elements produced according to this proposal is comparable to that obtainable with "wave guide index lenses."

The concept of using a light beam to address a suitable optical storage media is well known. Numerous read-write or read-only media have been proposed including magneto-optic materials such as MnBi, MnGaGe, MnAlGe, EuO, amorphous semiconductors such as AsTeGe, ferroelectric-photoconducting sandwiches, photochromatic films, silver halides, and the like. A major problem, however, is to achieve an optical system and associated mechanical structure capable of providing a storage system which is sufficiently attractive compared to conventional magnetic recording. Very high bit densities along the track have been achieved in mangnetic tape systems, e.g. over 20,000 bpi in instrumentation tape recorders. Even greater bit densities are projected for magnetic recording systems within the decade.

The resolution of an optical storage system is one of the fundamental limits of the optical storage system. A lens that covers a large field with a good resolution is expensive.

SUMMARY OF THE INVENTION

It is therefore an object of the present invention to provide a head or transducer usable in optical storage systems which provides high resolution without the expense associated with conventional lens systems.

It is another object of the invention to provide an integrated optic read-write head or write-only head which is easily fabricated using conventional integrated circuit techniques and provides superior resolution.

It is a further object of the invention to provide an integrated optic transducer for use in an optical storage system which, due to its superior resolution characteristics, permits optical storage bit densities greater than heretofore economically feasible.

According to the present invention, these and other objects are attained by utilizing the high resolution focusing properties which result from near-field diffraction of a slit or its equivalent. The slit-optics techniques employed in the invention permit 0.41 $\lambda$ spots to be obtained economically. The slit is flown over the recording media much like a magnetic head to provide high bit densities approaching 75,000 bpi along the track. Even greater bit densities can be expected as technology for shorter wave lengths becomes available. Various embodiments of the invention are possible, but a head made in accordance with the teaching of the invention may be considered as comprising three sections: an illuminating section, a coupling section, and a focusing section. The head may comprise all of these sections in a fully integrated optical structure fabricated using techniques similar to those used for integrated semiconductor circuitry. If a fully integrated structure is contemplated, illumination may be provided by an integrated semiconductor laser coupled to the optical wave guide preceding the slit or its equivalent. In the alternative, illumination may be provided by an outside source coupled to the integrated head structure. Coupling into the head structure may be accomplished by end illumination, prisms, reflective or refractive diffraction gratings, or Bragg diffraction grating. Coupling of the illumination section to the focusing section may be accomplished either with a thin slit or tapered dielectric or metallic couplers. Focusing may be variously accomplished by the use of a stack of thin slits, or the use of dielectric or metallic wave guides (thick slits). The head may comprise a single focusing element or a plurality of focusing elements with beam-steering by means of acoustical beam-steering techniques. Among other purposes of the invention is to minimize the wear-and-tear problem presented in heads utilizing slit-optics and to economically integrate the various components of the optical system.

BRIEF DESCRIPTION OF THE DRAWINGS

The specific nature of the invention, as well as other objects, aspects, uses and advantages thereof, will clearly appear from the following description and from the accompanying drawings in which.

DESCRIPTION OF THE PREFERRED EMBODIMENTS

Figure 1:
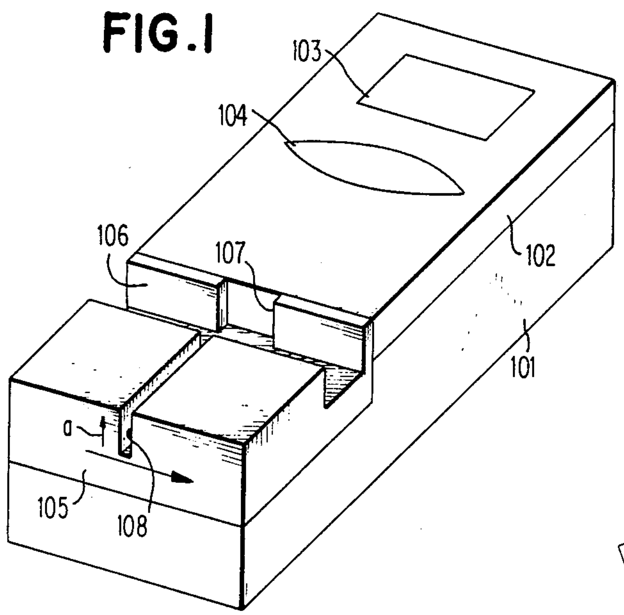
FIG. 1 is a pictorial illustration of one embodiment of an integrated optic transducer according to the invention in which focusing and coupling is accomplished with metallic slits and illumination is either by an outside source or an integrated source.

Investigations of the electromagnetic diffraction have been reported in the literature.

The derivation of formula for the near-field diffraction of an infinite slit is presented in an article by B. J. Lin, "EM Near-Field Diffraction of a Medium Slit", J. Opt. Soc. AM. 63, 976 (1972). The B. J. Lin paper suggests that slit-optics may be useful in high resolution, contact or near-contact printing. To illustrate the resolution advantages of slit-optics, some computed data are tabulated in Table 1. In Table 1, W is the slit width; $z$ is the distance from the slit; intensity is the amplitude square of the transverse electric field referring to the unit-intensity of a plane-wave, normally-incident, beam; half-power-width is the distance between the points which the intensity is half of the peak intensity at the same z; and $$\frac{1}{I}\frac{dI}{dx}\bigg|_{x} = \frac{HPW}{2}$$

is a measure of the slope of the diffraction curves at the half-power points, and it serves to indicate whether a good definition of the image can be obtained with reasonable tolerance in exposure accuracy. Though a critical value has to be determined for each recording material, it is safe to assume good image definition when the value of the measure of the slope of the diffraction curves is above 2.

TABLE I

| Slit Only $W(\lambda)$ | $z(\lambda)$ | Intensity on Axis | $(\lambda)$ Half-Power-Width | $\frac{1}{I}\frac{dI}{dx}\Big\|_{x} = \frac{HPW}{2}$ |
|---|---|---|---|---|
| 0.75 | 0.0 | 2.57 | 0.41 | 7.19 |
| 0.75 | 0.1 | 2.36 | 0.41 | 7.03 |
| 0.75 | 0.2 | 2.01 | 0.44 | 6.27 |
| 0.75 | 0.3 | 1.68 | 0.50 | 4.93 |
| 0.75 | 0.4 | 1.41 | 0.58 | 4.53 |
| 0.75 | 0.5 | 1.20 | 0.67 | 3.78 |
| 1.3 | 0.0 | 1.41 | 1.17 | 12.5 |
| 1.3 | 0.1 | 2.09 | 0.6 | 2.39 |
| 1.3 | 0.2 | 2.49 | 0.48 | 5.55 |
| 1.3 | 0.3 | 2.637 | 0.468 | 6.00 |
| 1.3 | 0.35 | 2.639 | 0.474 | 6.00 |
| 1.3 | 0.4 | 2.61 | 0.48 | 5.92 |
| 1.3 | 0.5 | 2.55 | 0.50 | 5.81 |
| 1.3 | 0.6 | 2.32 | 0.55 | 5.14 |
| 2.35 | 0.0 | 1.42 | 0.77 | −1.54 |
| 2.35 | 0.5 | 0.51 | 1.61 | 5.14 |
| 2.35 | 1.0 | 1.79 | 1.63 | 1.67 |
| 2.35 | 1.2 | 2.07 | 0.75 | 2.72 |
| 2.35 | 1.3 | 2.15 | 0.74 | 3.08 |
| 2.35 | 1.4 | 2.21 | 0.74 | 3.28 |
| 2.35 | 1.5 | 2.237 | 0.756 | 3.42 |
| 2.35 | 1.55 | 2.244 | 0.764 | 3.44 |
| 2.35 | 1.60 | 2.247 | 0.772 | 3.46 |
| 2.35 | 1.70 | 2.242 | 0.792 | 3.47 |
| 2.35 | 1.80 | 2.225 | 0.816 | 3.26 |
| 2.35 | 1.90 | 2.20 | 0.84 | 3.26 |
| 2.35 | 2.0 | 2.17 | 0.87 | 3.22 |

From the Table, it is clear that a 0.41λ image (4th column from left) can be obtained with a 0.75λ slit (Column 1) at a 0.1λ distance (Column 2), or a 0.44λ image at 0.2λ distance. A more practical case would be a 1.3λ slit which gives higher intensity (Column 3), longer focal point (Column 2), and larger depth-of-focus with slight sacrifice in resolution, i.e., a 0.48λ image can be obtained at 0.2λ to 0.4λ from the slit with a peak intensity of 2.64. In all these cases, the spot size is smaller than the slit, and it is in a region not achievable by conventional optics. If the resolution requirement is relaxed to 0.8λ, the 2.35λ slit gives a focal point of 1.5λ and a depth-of-focus of 0.5λ with peak intensity at 2.47.

If a high numerical aperture (NA) lens is used instead of the slit, its HPW is estimated by 0.5λ/NA. Therefore, for an image of 0.5λ, a lens of unity NA is required, which is permissible in theory but impractical. For a 0.8λ image, the NA required is 0.625. Such a lens is extremely expensive and may still have many practical problems such as the polarization shift, etc.

On the other hand, a low NA lens can be combined with a slit to increase the incident power density if the light source has a much larger emitting area than the slit. Calculation shows that a 0.3λ slit can increase the intensity of a 0.343 NA converging cylindrical wave by a factor of 2 giving a HPW of 0.496λ at 0.3λ from the slit. The intensity of the incident wave is now about 20 times higher than that without using the lens.

Slit-optics compares favorably with the current magnetic recording systems. An 0.8λ image using λ = 0.843 micron corresponds to a density of 37,600 bits per inch. The slit flies at 1.5λ = 12,500 A above the disc. For the 0.41λ image, the storage density is 75,000 bits per inch, and further improvement can be expected as technology for shorter wave lengths becomes available.

The radiation characteristic at the open end of metallic wave guides has been investigated, and for the $TE_{01}$ mode, a 0.75λ planar wave guide gives a 0.44λ spot at 0.2λ from the end, while a 1.5λ wave guide gives a 0.68λ spot at 0.3λ from the end, and a 2λ planar wave guide gives a 0.86λ spot at 0.6λ from the end. In the Transverse Electric mode (TE), the electric field vector in the slit is in the direction shown by the arrow *a* in FIG. 1. The propagation loss of a real rectangular wave guide using a typical good conductor giving a 0.96 reflectivity, has been evaluated. A 1.5λ by 7.5λ metallic, air-filled, wave guide operating in the $TE_{01}$ mode has an attenuation coefficient of 0.1 per wave length. This means a guide length in the 10-wave length region can be used instead of the fractional-wave length requirement for the thickness of thin slits. Unlike the TM modes (Transverse Magnetic mode — also in the direction of arrow *a* which may be reflected significantly at the open end, reflection for the TE mode is below 20%.

Figures 7, 8, 9, 10, 11, 12, 13, 14:
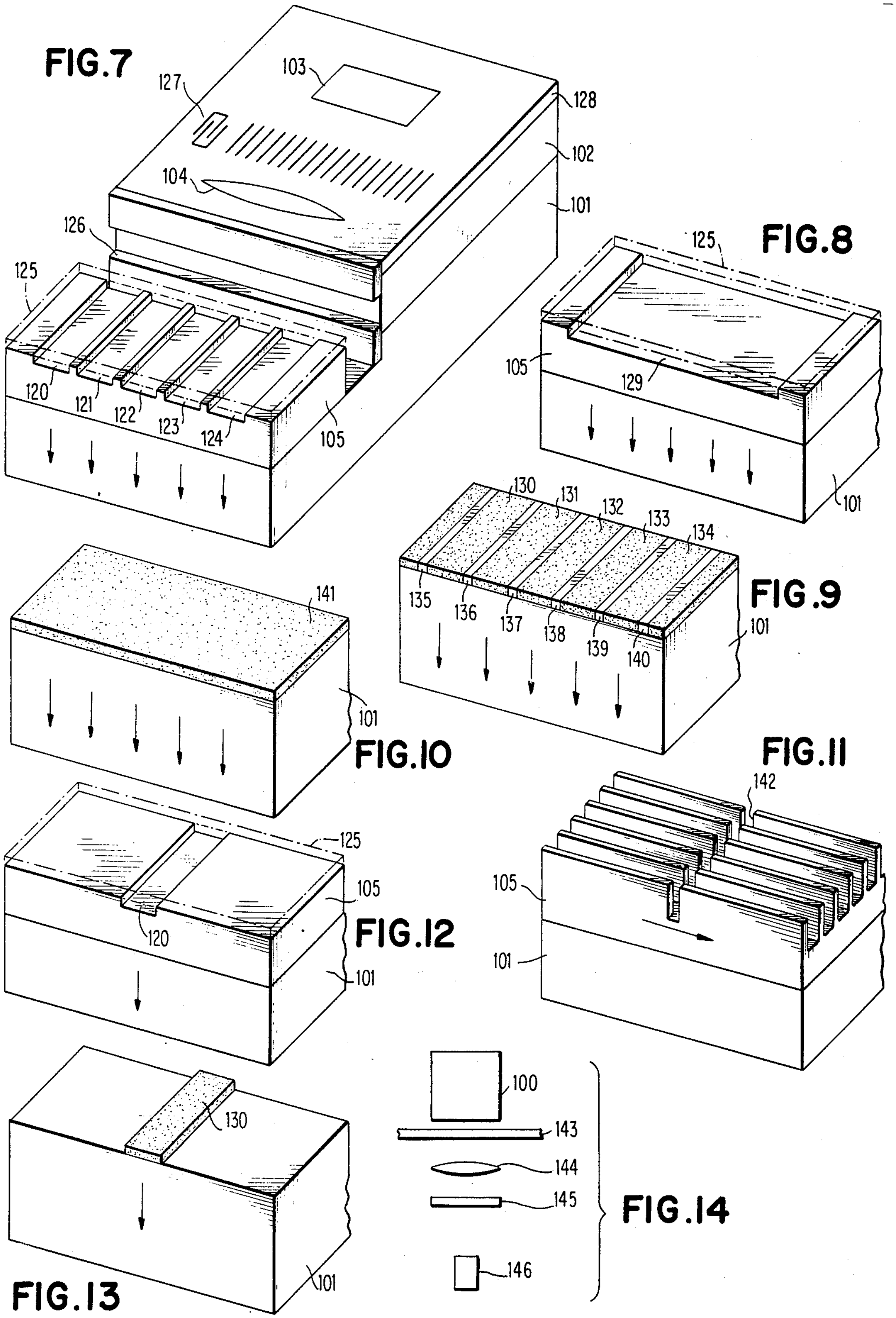
FIG. 7 illustrates a variation of the transducer of FIG. 1 having a plurality of thick slits for focusing and provisions for acoustical beam-steering between each of the several slits.
FIG. 8 illustrates a variation of the focusing section of the transducer shown in FIG. 7 without separation in the focusing slits.
FIG. 9 illustrates another variation of the focusing section of the transducer shown in FIG. 7 with separated dielectric wave guides instead of the metallic wave guides.
FIG. 10 illustrates a variation of the focusing section shown in FIG. 7 wherein the dielectric wave guides are unseparated.
FIG. 11 illustrates a variation of the focusing section of the transducer shown in FIG. 1 employing a stack of metallic thin slits.
FIG. 12 illustrates another variation of the focusing section of the transducer of FIG. 1 using a horizontal metallic wave guide.
FIG. 13 illustrates a variation of the focusing section shown in FIG. 12 using a horizontal dielectric wave guide in lieu of the metallic wave guide.
FIG. 14 illustrates how a transducer constructed in accordance with the teachings of the invention may serve as an illuminating head for readout.

The transducer system has an integrated circuit using a metallic wave guide as shown in FIG. 1 of the drawings. On one part of the substrate 101, a high refractive-index, dielectric material 102 is used as a dielectric planar wave guide. The substrate may be glass with a refractive index of 1.5 or below. The dielectric material of the wave guide may be tantalum pentoxide ($Ta_2O_5$) having a refractive index of 2.2, and a loss of 1 to 4 dB/cm, or may be polymerized organosilicon having a loss of 0.04 dB/cm. At one end of the transducer is a monochromatic illuminating source or coupler 103 which is followed along the axis of the transducer by a condensing lens 104. The light source or the coupler is shown schematically in FIG. 1 and may be an internal or external source. The lens 104 also can be fabricated with well-known integrated optics techniques and could, for example, be a raised portion or a depressed portion. The depressed portion could be a spherical depression. At the end opposite the source or coupler 103, a good conductor 105 is deposited on the substrate 101. The conductor is provided with air-filled openings or gaps. The first of these is a gap perpendicular to the axis of the transducer and is designated by the reference number 106. The effect of this gap is to provide a thin metallic end wall at the end edge of the dielectric wave guide 102. This thin end wall is provided with a slit 107. The light introduced at 103 is focused on the slit 107 by the lens 104. A narrow gap 108 perpendicular to the gap 106 and along the axis of the transducer is aligned with the slit at 107. The smallest dimension of the gap 108 is the slit width. The slit 107 further focuses the light onto slit 108. The openings or gaps in the conductor 105 may be made with electron beam techniques combined with directional etching, "lift-off" or electroplating techniques. The gap 108 need not be closed at the upper side. The orientation of the transducer with respect to a magneto-optical recording disc shown as 143 in FIG. 14 is such that the larger dimension of the air gap 108 is aligned with a radial line of the disc. That is, the relative movement of the recorded track is across the narrow width of the wave guide as indicated by the arrows in the various Figures.

Figures 2, 3:
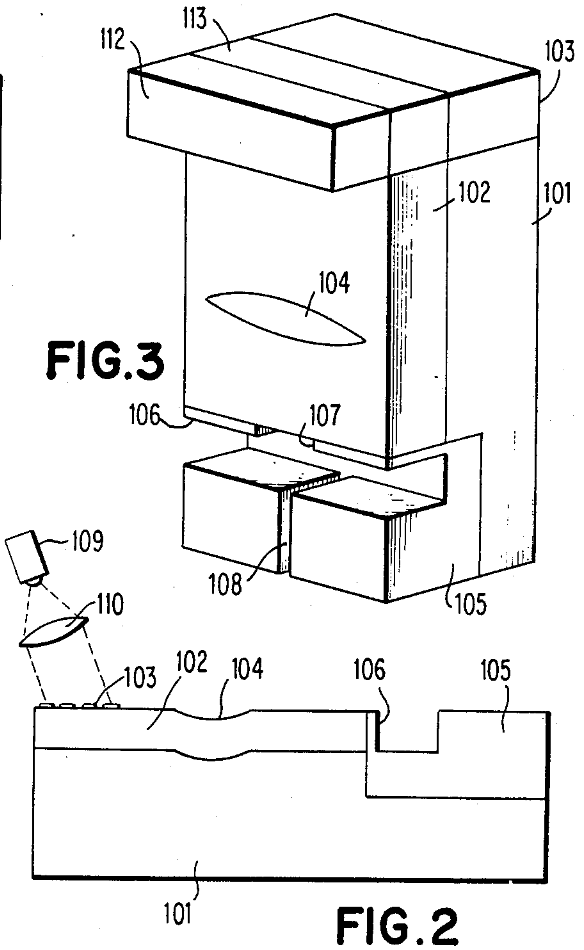
FIG. 2 shows a transducer similar to that of FIG. 1 employing outside illumination and an integrated coupler and condensing lens system.
FIG. 3 shows a transducer similar to that of FIG. 1 with an integrated semiconductor laser for an illuminating source.

FIG. 2 is a side veiw of a transducer similar to that shown in FIG. 1 but illustrating a technique of illumination by an outside source. In this arrangement, the wave guide 102, a refractive grating coupler 103 and depression lens 104 are integrated on the substrate 101. The coupler 103 is illuminated by a source 109 such as a GaAs laser and columnating lens 110. The coupler 103 is formed on the upper surface of the dielectric wave guide.

Alternate techinques for coupling the light to the wave guide 102 may also be used. For example, light waves may be coupled into the optical wave guide 102 by means of a reflective grating on the lower surface of the wave guide 102. A light coupling can also be achieved into the wave guide 102 by means of a thick Bragg type diffraction grating extending along one surface of the dielectric film. Coupling of light waves to the wave guide 102 can also be achieved by means of the distributed action of the evanescent field of a light wave in an internal-reflection prism disposed so close to the dielectric film that internal reflection is partially frustrated.

The transducer according to the invention may be a completely integrated structure as illustrated in FIG. 3 wherein like reference numerals designate corresponding or identical parts throughout. In this case, the illuminating source 103 is an integrated semi-conductor laser such as a GaAs junction 113. The laser 103 may be a single laser or an array of separate lasers.

Figures 4, 5:
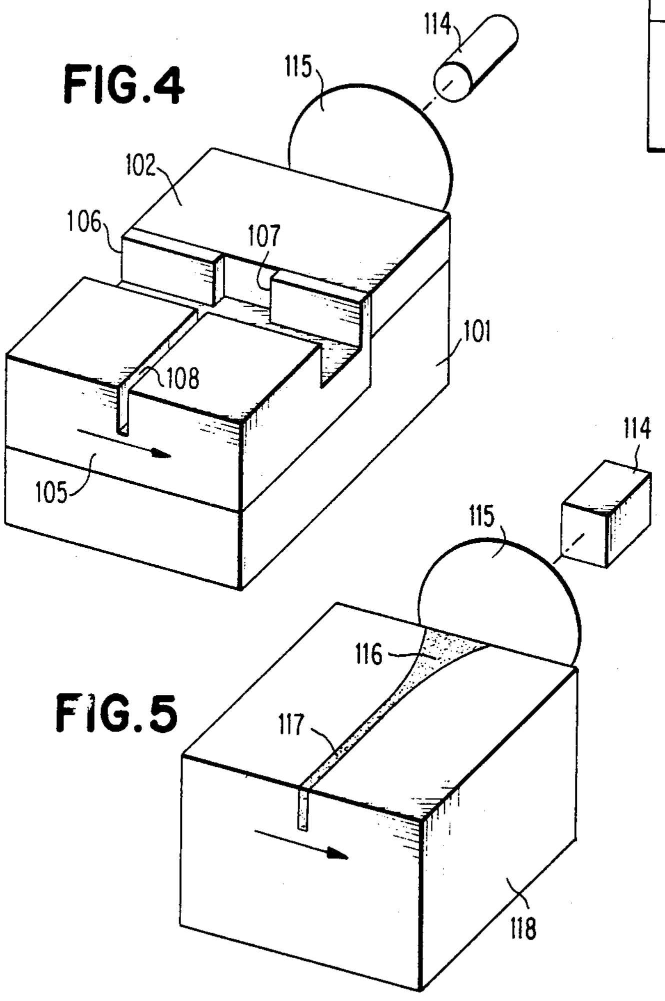
FIG. 4 shows a transducer similar to that of FIG. 1 with an outside illuminating source and condensing lens system with end coupling to an integrated wave guide.
FIG. 5 shows a variation of the transducer shown in FIG. 1 with an outside illuminating source and condensing lens but provided with a tapered dielectric coupler section.

FIG. 4 illustrates a situation in which only the dielectric wave guide 102, the slit 107 and the metallic wave guide 108 are integrated on the substrate 101. In this case, illumination from a separate light source 114, such as a GaAs laser, is focused by lens 115 on the end of dielectric 102 to provide end coupling therewith. Again, any of several known coupling techniques may be used.

Figure 6:
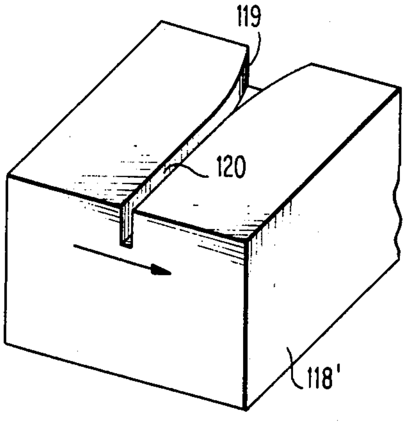
FIG. 6 shows the coupling and focusing section of FIG. 5 modified to provide coupling by a tapered metallic coupler.

The slit in FIG. 1 can be replaced by a tapered wave guide as illustrated in FIGS. 5 and 6. In FIG. 5, a tapered dielectric coupler 116 is illuminated by the laser 114 and condensing lens 115. The dielectric coupler 116 is connected to a vertical dielectric wave guide 117. The coupler 116 and wave guide 117 can be made on a glass substrate 118 by electron beam techniques as previously described. The arrangement of FIG. 6 is similar to that of FIG. 5 except that the tapered coupler 119 and the wave guide 120 are made in a metallic substrate 118 also by electron beam techniques. The principal advantage of either of the variations shown in FIGS. 5 and 6 is the ease of fabrication. However, there is more propagation loss due to the increased energy dissipating area, in the case of FIG. 6.

An alternative to the transducer shown in FIG. 1 is to place a plurality of metallic wave guides 120 through 124, for example, horizontally, as shown in FIG. 7. A fourth metal surface 125 shown in dotted lines is provided to complete the wave guides. In manufacture, the fourth surface 125 is completed by filling the air gaps of the wave guides 120 through 124 with a soluble substance, then metal is deposited on the substance, and the substance is later washed away. Since the cut in the conductor 105 is now very shallow, the wave guides 120 through 124 are easily made. However, more steps are necessary in order to make the wider, coupling slit 126. For example, the lower half of the slit 126 and the lower horizontal wall of the wave guides are first made by the lift-off technique. That the resultant air gap will be narrower at the bottom is unimportant. The rest of the wave guide walls can be made consequently as described. With the soluble substance unremoved, the fourth wall of the wave guides is covered with yet another layer of soluble substance, up to where the lower edge of the upper half of the slit 126 should be. Then, the upper half of the slit is made by depositing in the direction of the optical axis since the portion is not obstructed by the wave guides. Finally, the soluble substance is removed. In the alternative, if one is not very concerned with coupling efficiency, the slit 126 can be omitted with the dielectric wave guide 102 directly connecting to the metallic wave guides 120 through 124.

The transducer shown in FIG. 7 is provided with an acoustical transducer 127 oriented perpendicular to the axis of the transducer and between the illuminating source or coupler 103 and the integrated lens 104. Track selection as well as servoing to the selected track can be accomplished by means of the integrated acoustic transducer 127 acting on the light beam before lens 104 to selectively direct the light into the desired one of the wave guides 120 through 124. The band width of the acoustic transducer 127 can be increased to about 15% by using a ZnO or AlN overlay 128. Acoustic beam-steering by Bragg diffraction is described by L. Kuhn, M. L. Dakss, P. F. Heindrich and B. A. Scott, Appl. Phys. Let. 17, 265 (1970).

With precise beam-steering and focusing in the integrated optics, the walls between the individual wave guides can be omitted. This is illustrated in FIG. 8 which shows the focusing section only of the transducer shown in FIG. 7. In this case, the separate wave guides 120 to 124 are replaced by a single unseparated wave guide 129, but it will be understood, that the effect is the same, i.e., a plurality of separate image positions corresponding to the positions of the record tracks may be selected.

Transducers similar to those of FIGS. 7 and 8 may in the alternative be made wherein the conductor 105 is replaced by the substrate material 101, and the air gap is replaced by a high index dielectric as illustrated in FIGS. 9 and 10. In FIG. 9 the wave guides 120 through 124 of FIG. 7 are replaced by segmented dielectric wave guides 130 to 134. The segmented dielectric wave guides 130 to 134 are separated from one another by metal separations 135 through 140. These metallic walls 135 to 140 prevent the evanescent coupling between wave guides if very close spacing between the guides is desired. As in the case of FIG. 8, with precise beam steering and focusing, the metallic separations 135 to 140 embedded in the dielectric, may be omitted as shown particularly in FIG. 10 wherein the dielectric 141 is deposited on the substrate 101. Either a tapered coupling or a metallic slit can be used to couple light to the dielectric wave guide sections of FIGS. 9 and 10; tapered coupling may be preferred since it is easier to make. The tapered part can be made by thickness controlled deposition according to techniques well-known in the art.

Dielectric wave guides are good in terms of low propagation loss and the easiness of fabrication; however, one drawback is the radiating surface is a polished dielectric surface instead of an air gap. This can be scratched, thus degrading the quality of the image and decreasing the output intensity. Poorer resolution with respect to metallic wave guides is another drawback.

Referring now to FIG. 11 of the drawings, an alternative to the metallic wave guides is a stack of identical thin slits 142 displaced periodically along the optical axis of the transducer. The thin slits may be manufactured using electron beam techniques in the conductor 105 supported by the substra te 101. The distance between the slits is about the focal length of each slit. This stack of slits can also be coupled by means of a wider slit. The schemes of integration and methods of fabrication are similar to those thus far described and can be easily practiced. The advantage of the stack of thin slits is the possibility of fully utilizing the resolution potential of thin slits.

While the wave guide 108 of the transducer shown in FIG. 1 was illustrated as being oriented vertically, it will be understood that the invention may be practiced with the wave guide oriented horizontally as shown in FIG. 12. This arrangement is similar to that shown in FIG. 7 except that a single wave guide 120 in the conductor 105 is provided. The fourth wall of the wave guide 120 is provided by the metallic cover 125 illustrated in dotted lines. The alternative to the structure shown in FIG. 12 is the dielectric wave guide 130 on the glass substrate shown in FIG. 13. The advantage to the structures shown in FIGS. 12 and 13 is the relatively shallow cut or deposition with respect to those of FIGS. 1,4, and 6. Whereas, the disadvantage to the structure shown in FIGS. 12 and 13 is the difficulty in making the coupling slit 126 as illustrated in FIG. 7.

The various structures shown and described to this point have been directed to a write head useful in an optical storage system. The write head, at a reduced intensity, may serve as an illuminating head for readout as shown in FIG. 14. The readout light from the transducer 100 has its polarization changed because of the Faraday effect as it passes through the magnetized disc 143. A polarization analyzer 145 rejects light of the polarization given by an unwritten bit, while providing a signal for the photo-detector 146 when a written bit is sensed. The readout lens 144 does not have to be an expensive high numerical aperture lens, because the write head limits the size of the readout spot to that of a single bit.

It will be apparent that the embodiments shown are only exemplary and that various modifications can be made in construction and arrangement within the scope of the invention as defined in the appended claims.

What is claimed is:

1. An optical transducer providing high resolution focusing on a record-track surface movable relative to said transducer in an optical storage system, comprising:

illuminating means for providing a monochromatic source of light, slit-optics focusing means for focusing a spot of light smaller than the slit width dimension of said focusing means on said surface, and a thin slit wider than the width of said slit-optics focusing means disposed between said illuminating means and said slit-optics focusing means for focusing the light from said illuminating means on said slit-optics focusing means.

2. An optical transducer as recited in claim 1 wherein said slit-optics focusing means is a metallic wave guide longitudinally aligned with the optical axis of the transducer and having the slit-width thereof oriented in a direction parallel to the direction of relative motion between the transducer and said surface.

3. An optical transducer as recited in claim 1 wherein said slit-optics focusing means is a dielectric wave guide longitudinally aligned with the optical axis of the transducer and having the slit-width thereof oriented in a direction parallel to the direction of relative motion between the transducer and said surface.

4. An optical transducer as recited in claim 1 wherein said slit-optics focusing means is a stack of thin slits disposed periodically along the optical axis of the transducer and separated by a distance approximately equal to the focal length of each slit, the slit-width dimensions of the slits being oriented in a direction parallel to the direction of relative motion between the transducer and said surface.

5. An optical transducer as recited in claim 1 wherein said slit-optics focusing means comprises a plurality of metallic wave guides in an array longitudinally aligned in parallel with the optical axis of the transducer and the slit-widths oriented in a direction parallel to the direction of relative motion between the transducer and said surface, wherein each of said wave guides in said array corresponds to a different position or track on said surface.

6. An optical transducer as recited in claim 5 wherein said wave guides are separated from one another by metallic separating walls.

7. An optical transducer as recited in claim 5 wherein said plurality of wave guides are comprised of a single, elongated slit.

8. An optical transducer as recited in claim 5 further comprising beam-steering means disposed between said illuminating means and said coupling means for selectively directing light from said illuminating means to a selected one of said plurality of wave guides thereby permitting selection of a particular track on said surface.

9. An optical transducer as recited in claim 8 wherein said beam-steering means includes an acoustic transducer disposed to project an acoustical wave perpendicular to the optical axis of said transducer.

10. An optical transducer as recited in claim 1 wherein said slit-optics focusing means comprises a plurality of dielectric wave guides in an array longitudinally aligned and parallel with the optical axis of the transducer and the slit-widths oriented in a direction parallel to the direction of relative motion between the transducer and said surface, wherein each of said wave guides in said array corresponds to a different position or track on said surface.

11. An optical transducer as recited in claim 10 wherein said wave guides are separated from one another by metallic separating walls.

12. An optical transducer as recited in claim 10 wherein said wave guides are comprised of a single elongated dielectric wave guide.

13. An optical transducer as recited in claim 10 further comprising beam-steering means disposed between said illuminating means and said coupling means for selectively directing light from said illuminating means to a selected one of said plurality of wave guides thereby permitting selection of a particular track on said surface.

14. An optical transducer as recited in claim 13 wherein said beam-steering includes an acoustic transducer disposed to project an acoustical wave perpendicular to the optical axis of said transducer.

15. An optical transducer as recited in claim 1 wherein said illuminating means comprises:

a source of monochromatic light, and a dielectric wave guide into which light from said source is coupled for conducting said light to said coupling means.

16. An optical transducer as recited in claim 15 further comprising an integrated condensing lens formed in said wave guide.

17. An optical transducer as recited in claim 16 wherein said source is external and comprises:

a laser, an optical coupler disposed to couple light into said wave guide, and a collimating lens focusing light from said laser onto said optical coupler.

18. An optical transducer as recited in claim 16 wherein said source is integrated with said dielectric wave guide and comprises a semiconductor laser junction.

19. An optical transducer as recited in claim 1 for reading bits of information recorded in said surface further comprising detecting means disposed on the opposite side of said surface for detecting light when a recorded bit is illuminated by said focusing means.

20. An optical transducer as recited in claim 19 wherein said detecting means comprises:

analyzer means oriented to pass light the polarization of which has been changed by passing through said surface, and a photo-detector for sensing the light passed by said analyzer means.

21. An optical transducer as recited in claim 1 wherein at least said slit-optics focusing means and said coupling means are constructed using integrated optics techniques.

22. An optical transducer providing high resolution focusing comprising:

means for receiving monochromatic light, slit-optics focusing means for focusing a spot of light smaller than the slit width dimension of said focusing means, and a thin slit wider than the width of said slit-optics focusing means disposed between said light receiving means and said slit-optics focusing means for focusing the received light on said slit-optics focusing means.

23. An optical transducer as recited in claim 22 wherein said slit-optics focusing means is a metallic waveguide longitudinally aligned with the optical axis of the transducer.

24. An optical transducer as recited in claim 22 wherein said slit-optics focusing means is a dielectric waveguide longitudinally aligned with the optical axis of the transducer.

25. An optical transducer as recited in claim 22 wherein said slit-optics focusing means is a stack of thin slits disposed periodically along the optical axis of the transducer and separated by a distance approximately equal to the focal length of each slit.

26. An optical transducer as in claim 22 wherein said means for receiving light is an optical grating.

27. An optical transducer as in claim 22 wherein said slit optics means comprises a plurality of waveguides and said coupling means includes means for selectively steering light into individual ones of said waveguides.

28. An optical transducer as in claim 27 wherein said steering means includes an acoustic transducer disposed to project an acoustical wave perpendicular to the optical axes of said transducer.

29. An optical transducer providing high resolution focusing, comprising:

illuminating means for providing monochromatic light, slit-optics focusing means for focusing a spot of light smaller than the slit width dimension of said focusing means, and a thin slit wider than the width of said slit-optics focusing means disposed between said illuminating means and said slit-optics focusing means for focusing the light from said illuminating means on said slit-optics focusing means.

30. An optical transducer as recited in claim 29 wherein said slit-optics focusing means is a metallic waveguide longitudinally aligned with the optical axis of the transducer.

31. An optical transducer as recited in claim 29 wherein said slit-optics focusing means is a dielectric waveguide longitudinally aligned with the optical axis of the transducer.

32. An optical transducer as recited in claim 29 wherein said slit-optics focusing means is a stack of thin slits disposed periodically along the optical axis of the transducer and separated by a distance approximately equal to the focal length of each slit.

33. An optical transducer as in claim 29 wherein said means for receiving light is an optical grating.

34. An optical transducer as in claim 33 wherein said slit optics means comprises a plurality of waveguides and said coupling means includes means for selectively steering light into individual ones of said waveguides.

35. An optical transducer as in claim 34 wherein said steering means includes an acoustic transducer disposed to project an acoustical wave perpendicular to the optical axes of said transducer.

* * * * *